Patented Apr. 3, 1951

2,547,771

UNITED STATES PATENT OFFICE 2,547,771

SOLDER COMPOSITION

Leopold Pessel, Whitemarsh, Pa., assignor to Radio Corporation of America, a corporation of Delaware No Drawing. Application March 29, 1950, Serial No. 152,755

10 Claims. (Cl. 148—24)

This invention relates to improvements in solder compositions of the type known as soldering pastes. More particularly, the present invention relates to a soldering paste having an improved flux-vehicle.

In soldering electrical connections in places where the amount of solder and its distribution are to be carefully controlled, it is often convenient to apply a known amount of a solder paste and then to effect the solder joint by applying heat.

Solder pastes generally comprise two main parts. One of these is the solder metal in powder form. The other is the flux-vehicle which has the dual function of imparting proper physical characteristics, such as consistency, and of acting as a flux in the soldering process. Many types of solder paste compositions have been used in the past. Most of these previously used compositions have included a solder powder and a flux such as a rosin solution, zinc chloride solution, etc. These formerly used pastes have certain deficiencies making them undesirable, or even unusable, for certain applications. Some of the pastes have a tendency to dry out when standing in an open vessel. Thus, their viscosity changes and they become unusable. Others are too corrosive or leave a residue which is difficult to remove by washing. Others do not produce a smooth, even flow of solder on tarnished surfaces of metals such as copper or brass. This limits the effectiveness of many of the formerly used pastes.

One object of the present invention is to provide an improved solder paste which is substantially free of the above stated disadvantages.

Another object of the invention is to provide an improved solder paste which makes strong solder joints.

Another object of the invention is to provide an improved solder paste having good flow properties on surfaces such as tarnished copper or brass.

Another object of the present invention is to provide a solder paste which does not dry out appreciably nor become gummy when it stands exposed to air for long periods of time.

Another object of the present invention is to provide a solder paste which is essentially non-corrosive.

A still further object of the present invention is to provide a solder paste which can be readily removed by washing with water.

These and other objects will be more apparent and the invention will be more readily understood from the following description:

The improved solder pastes of the present invention comprise a flux-vehicle and powdered solder metal. The flux-vehicle comprises an aqueous solution of sorbitol and, preferably, a polyalkylene glycol. Other ingredients, such as an alkanol amine may also be added to impart good stability. For some types of soldering operations, it is also desirable to use an additional flux such as zinc ammonium chloride or levulinic acid. The solder metal component of the pastes may comprise any powdered solder metal and, preferably, soft solder metals having melting points lower than about 625° F.

The main fluxing ingredient of the present compositions is sorbitol, a hexahydric alcohol having a melting point of 93° C. in its pure form. Technical grades of this material may be purchased, however, and these usually take the form of an aqueous syrup. That technical grade which is an aqueous syrup having a sorbitol concentration of about 83% may be used since it is a fluid at room temperatures and combines proper fluxing properties with a desired amount of tackiness and body-forming properties. The technical grade of sorbitol preferred for use in the invention is further identified as being prepared by either electrolytic or catalytic reduction of glucose or fructose in aqueous alkaline solution. In the electrolytic reduction process, nascent hydrogen, liberated at the cathode, hydrogenates the reducing group of the sugar to an alcohol group. Mannitol and sorbitol are the principal products formed by this process. The sorbitol is recovered from the sugar-free finished cell liquor by extracting the polyhydric alcohols with ethyl alcohol and separating the mannitol and sorbitol by fractional crystallization. Activated carbon is used to purify and decolorize the product. In this process, small amounts of other polyhydric materials remain fixed with the sorbitol. These have the effect of helping to prevent crystallization of concentrated solutions but they have no apparent effect on the soldering properties of these compositions. Suitable technical grade sorbitol can be purchased under the trade name "Arlex" (Atlas Powder Co., Wilmington, Del.). "Arlex" is a syrup having 83% by weight polyhydric alcohol content, practically all of which is sorbitol. Water content is 16% by weight.

Suitable compositions may also be made up by preparing 20 to 83% by weight solution of pure d-sorbitol in water.

A water solution of sorbitol, alone, may be used as the flux-vehicle for certain applications. For other soldering applications, however, physical properties not possessed by sorbitol, alone, are required. For example, in a particular mechanical soldering operation performed by machine, it was necessary to have a solder paste which could be applied in small, accurately measured quantities from an open container. It was also necessary that the solder composition have a viscosity of between about 5,000 and 50,000 centipoises. For proper operation, the vehicle had to act as a spreader, have very low volatility, be air stable with no tendency to oxidize upon long exposure, be inert with respect to both the sorbitol and the solder powder, and also, preferably, be water soluble.

The vehicle found to meet the above requirements best was any one of a number of water soluble alkylene glycols or polyalkylene glycols. Of these, polyethylene glycol, having an average molecular weight of about 200 to 700, was preferred.

Examples of other suitable glycols are:

Tetraethylene glycol
2,3 butanediol
Nonaethylene glycol
Glycerine
Dipropylene glycol
2-ethyl hexanediol 1,3
Butyne diol
Pentane diol The molecular weight, per se, of the material, is not important except as it is related to the viscosity. The viscosities of the liquid glycols generally increase with their molecular weights. Since different types of soldering operations require compositions of different viscosities, the particular average molecular weight selected will depend upon the use to which the composition is to be put. It is usually more convenient to obtain a material having a particular molecular weight (or viscosity) by mixing together the necessary proportions of materials having high molecular weights and those having low molecular weights.

Sorbitol and polyethylene glycol are generally sufficient to provide a flux-vehicle which is satisfactory for a wide variety of soldering operations. If it is desired to keep the composition in ready-mixed form for long periods of time, however, it is desirable to add an ingredient such as an alkanolamine, for example, monoethanolamine, which increases the stability. Stability is increased by inhibiting the tendency of the sorbitol to crystallize. The amine is preferably present in the amount of 2 to 20% by weight of the flux-vehicle. Also, in soldering operations where a very strong flux is required, it is desirable to add a minor proportion of a second flux ingredient, such as zinc ammonium chloride or levulinic acid.

The solder metal used in the compositions of the present invention may be any finely comminuted soldering metal. It should, preferably, have a fineness of at least 100 mesh. Much finer sizes, such as 200 or 350 mesh powders, may be used, however, and coarser grades, as, for example, up to about 35 mesh, may also be used. A few characteristic solder compositions suitable for use in the present invention are listed below:

TABLE I

[Percentages by weight.]

| Lead | Tin | Bismuth | Cadmium | Others |
|------|-----|---------|---------|--------|
| 95   |     |         |         | Silver 5 |
| 60   | 40  |         |         |        |
| 50   | 50  |         |         |        |
| 40   | 60  |         |         |        |
|      | 33  | 39      | 28      |        |
|      | 72  |         | 28      |        |
|      |     | 60      | 40      |        |

It is preferred to use solder alloys having a melting point of below 625° F., although alloys may be used having melting points of 700° F., or even higher. The solder metals used in the present invention are not critical, however. As examples of specific compositions falling within the scope of the present invention, there may be listed the following:

*Example I*

Percent by weight

Solder powder, 100 mesh (50 parts tin and parts lead) _____ 50
Sorbitol (70% aqueous solution) _____ 40
Monoethanolamine _____ 10

*Example II*

Percent by weight

Solder powder, 200 mesh, 60 tin and 40 lead__ 75
Flux-vehicle _____ 25

Percent by weight

Polyethylene glycol, average molecular weight, about 700_____ 11
Polyethylene glycol, average molecular weight, about 200_____ 25.7
Monoethanolamine _____ 8
Sorbitol (70% by weight aqueous solution) _____ 55.3

*Example III*

Percent by weight

Solder powder, 80 mesh, 40 tin and 60 lead___ 60
Flux-vehicle _____ 40

Percent by weight

Polyethylene glycol, having an average molecular weight of 650_____ 12
Polyethylene glycol, having an average molecular weight of 200_____ 20
Levulinic acid (99% concentration) _____ 10
Monoethanolamine _____ 8
Sorbitol, technical grade (83% aqueous solution) "Arlex"_____ 50

*Example IV*

Percent by weight

Solder powder, 50 tin and 50 lead_____ 50
Flux-vehicle _____ 50

Percent by weight

Polyethylene glycol, average molecular weight 700_____ 13.3
Sorbitol (70% by weight aqueous solution) _____ 66.7
Zinc ammonium chloride (43% by weight aqueous solution) _____ 20.0

The ingredients in the above-described examples may, in most cases, be combined by simply mixing without application of heat. In some cases, it is desirable to prepare the flux-vehicle separately by melting the ingredients together with gentle application of heat until a homogeneous flux-vehicle is obtained. Thus, the polyethylene glycol may be selected, having a molecular weight of about 600 to 700. This ingredient is first melted at moderate temperatures and the lower molecular weight glycol, if any, and any other liquid ingredients are then slowly stirred into the melted mass. Subsequently, the solder powder is stirred into the flux-vehicle until the desired proportions are obtained. The proportions of high and low molecular weight glycols are, of course, so selected as to give a viscous paste at room temperatures.

Solder joints may be made between pieces of tarnished copper sheet by placing about 0.05 gram of the mixture between the metal sheets. Heat is then applied from the outside of one sheet by means of a soldering iron. This produces strong joints having good electrical conductivity. The above described compositions are also especially adapted to be used in mechanical, automatic soldering operations requiring the application of small quantities of solder paste without undue spreading occurring from the point of application. In such applications, the solder paste must be of just the right consistency so that it does not spread over the work. Also, the paste must not thicken or acquire a scum upon exposure to air in an open pot.

Certain variations are possible in the above described compositions. As previously pointed out, any of the usual solder metals can be used. It is preferred, however, to use what is known as a soft solder having a melting point of less than 625° F. The fineness of the powder may vary between about 35 and 350 mesh. The percentage of solder powder in a complete composition may be varied within wide limits. A very stiff compound may contain at least 95% of solder powder by weight. A very thin composition may contain as little as 5% of the solder powder. A preferred composition comprises 75% by weight of solder powder and 25% by weight of flux-vehicle. The relative proportions of sorbitol and polyalkylene glycol may also be varied considerably. Generally, the composition is such that the sorbitol comprises not less than 10% nor more than about 85% by weight of the entire flux-vehicle. Preferred percentages are between 30 to 60% by weight In the compositions of the present invention, the monoethanolamine may be omitted, especially if the material is to be used promptly. Also, the levulinic acid and zinc ammonium chloride are not essential for most applications.

There have been thus described improved solder paste compositions which not only have many desirable physical properties but which provide excellent soldering properties. The compositions are especially useful in certain types of machine operated soldering operations for which previously known compositions have been found inadequate. The complete composition should have a viscosity between about 5,000 and 50,000 centipoises and may contain stabilizers in addition to solder powder, flux, and vehicle.

I claim as my invention:

1. A solder paste composition comprising finely comminuted soldering metals and a flux-vehicle comprising a syrupy, aqueous solution of sorbitol.

2. A solder paste composition comprising a suspension of finely comminuted soldering metals in a fluid flux-vehicle comprising sorbitol and a material from the class consisting of alkylene glycols and polyalkylene glycols.

3. A solder paste composition comprising a mixture of finely comminuted soldering metals and a flux-vehicle comprising sorbitol and polyethylene glycol having an average molecular weight of about 200 to about 700.

4. A solder paste composition comprising a mixture of finely comminuted soldering metals, a vehicle consisting essentially of water and polyethylene glycol having an average molecular weight of about 600 to about 700, and a flux comprising zinc ammonium chloride and sorbitol.

5. A solder paste composition comprising a mixture of finely comminuted soldering metals, and a flux-vehicle comprising a fluid mixture of polyethylene glycol having an average molecular weight between about 200 and about 700, sorbitol, and an alkanolamine.

6. A solder paste composition comprising a mixture of finely comminuted soldering metals, and a flux-vehicle comprising liquid polyethylene glycol having a molecular weight of at least 200, and an aqueous solution of sorbitol.

7. A solder paste composition comprising 5 to 95% by weight of finely comminuted solder metal and a flux-vehicle comprising a syrupy, aqueous solution of sorbitol.

8. A solder paste composition comprising equal parts by weight of a finely comminuted solder metal comprising lead and tin, and a flux vehicle comprising an aqueous solution of sorbitol having a syrupy consistency at ordinary room temperatures.

9. A solder paste composition comprising 25 to 75% by weight of finely comminuted solder metal and the remainder a fluid flux-vehicle comprising an aqueous solution of sorbitol, and polyethylene glycol having a molecular weight of between 200 and 700, said sorbitol comprising about 30 to 60% by weight of said flux-vehicle.

10. A solder paste composition comprising 60% by weight of a finely comminuted solder metal and 40% by weight of a flux-vehicle comprising 12% by weight of polyethylene glycol having a molecular weight of 650, 20% by weight of polyethylene glycol having a molecular weight of 200, 50% by weight of an 83% aqueous solution of technical grade sorbitol, 10% by weight of levulinic acid (99%), and 8% by weight of monoethanolamine.

LEOPOLD PESSEL.

REFERENCES CITED

The following references are of record in the file of this patent:

UNITED STATES PATENTS

| Number | Name | Date |
| --- | --- | --- |
| 2,361,867 | Pessel | Oct. 31, 1944 |
| 2,480,723 | Evans et al. | Aug. 30, 1949 |
| 2,493,372 | Williams | Jan. 3, 1950 |